(12) United States Patent
Kung et al.

(10) Patent No.: US 8,140,726 B2
(45) Date of Patent: Mar. 20, 2012

(54) SINGLE WIRE TRANSMISSION INTERFACE AND METHOD FOR THE SAME

(75) Inventors: Nien-Hui Kung, HsinChu (TW); Kwan-Jen Chu, Hsinchu (TW)

(73) Assignee: Richtek Technology Corporation, R.O.C. (TW)

( * ) Notice: Subject to any disclaimer, the term of this patent is extended or adjusted under 35 U.S.C. 154(b) by 393 days.

(21) Appl. No.: 12/604,566

(22) Filed: Oct. 23, 2009

(65) Prior Publication Data
US 2011/0095624 A1    Apr. 28, 2011

(51) Int. Cl.
*G06F 13/42* (2006.01)
*G06F 13/00* (2006.01)

(52) U.S. Cl. ........... 710/105; 710/34; 710/106; 713/502

(58) Field of Classification Search .............. 710/33–34, 710/58, 60–61, 105–106; 713/500, 502, 713/600
See application file for complete search history.

(56) References Cited

U.S. PATENT DOCUMENTS

| | | | |
|---|---|---|---|
| 7,127,631 B2 | 10/2006 | D'Angelo et al. | |
| 2003/0212918 A1* | 11/2003 | D'Angelo et al. | 713/500 |
| 2006/0143346 A1* | 6/2006 | Hollinger | 710/106 |
| 2008/0123730 A1* | 5/2008 | Robinson | 375/238 |
| 2010/0271251 A1* | 10/2010 | Ha et al. | 341/166 |

OTHER PUBLICATIONS

"A Discussion of the AS2CwireTM (Advanced Simple Serial ControlTM) Single-Wire Interface". Application Note AN-111. Advanced Analogic Technologies, Inc. Nov. 1, 2005. pp. 1-11.*
"A Complete Discussion of the S2CwireTM (Simple Serial ControlTM) Single-Wire Interface with TLAT Specification". Application Note AN-110. Advanced Analogic Technologies, Inc. Mar. 1, 2006. pp. 1-8.*

* cited by examiner

*Primary Examiner* — Thomas J Cleary
(74) *Attorney, Agent, or Firm* — Tung & Associates

(57) ABSTRACT

The present invention discloses a single wire transmission interface comprising: a signal detection circuit detecting level switchings of a transmission signal from a single wire, and generating an enable signal and a decoded signal corresponding to the transmission signal, the level switchings including first switchings from a first level to a second level and second switchings from the second level to the first level, wherein the enable signal starts according to one first switching of the transmission signal, and stops when no first switching occur in a predetermined period after one second switching of the transmission signal, and wherein rising edges (or falling edges) of the decoded signal correspond to the first switchings of the transmission signal; a counter, under enablement by the enable signal, counting a number of the rising edges (or the rising edges) of the decoded signal or the first switchings of the transmission signal, and generating a count; a single short pulse generator generating a short pulse according to the start of the enable signal to reset the decoded signal.

14 Claims, 2 Drawing Sheets

SINGLE WIRE TRANSMISSION INTERFACE AND METHOD FOR THE SAME

BACKGROUND OF THE INVENTION

1. Field of Invention

The present invention relates to a single wire transmission interface, and also to a method for single wire transmission.

2. Description of Related Art

Current transmission interfaces such as I2C, SPI, SMBUS require at least two wires, of which one is for data transmission and one is for clock transmission. If a single wire is capable of achieving both data and clock transmission, the pin number can be reduced. Hence, prior art U.S. Pat. No. 7,127,631 discloses a method for single wire series transmission and can be used for setting an internal operation mode or other parameters inside an integrated circuit. The method disclosed in the prior art is shown in FIG. 1, wherein when a receiving side detects a rising edge of an EN/SET signal, it is enabled to receive data (as shown by the waveform Enable) and generate a decoded signal (as shown by the third waveform) corresponding to the EN/SET signal; simultaneously, a counter at the receiving side starts counting the rising edges of the EN/SET signal (1~n). When the receiving side detects a falling edge of the EN/SET signal, it starts counting a time-out period (Time Limit). If the receiver side does not detect a next rising edge within the time-out period, it will shut down the signal Enable, reset the counter, and set the decoded signal to low.

In the foregoing prior art, when the time limit is reached, the count is reset and the decoded signal returns to the low level. However in certain applications, such arrangement is not necessary, or even undesired. After the time limit is reached, the decoded signal should be capable of staying at any level, such that a next-stage circuit can make different uses of it.

SUMMARY OF THE INVENTION

In view of the foregoing, an objective of the present invention is to provide a single wire transmission interface, wherein the decoded signal can stay at any level after a time limit is reached.

Another objective of the present invention is to provide a method for single wire transmission.

According to the foregoing objective, in one perspective of the present invention, it provides a single wire transmission interface comprising: a signal detection circuit detecting level switchings of a transmission signal from a single wire, and generating an enable signal and a decoded signal corresponding to the transmission signal, the level switchings including first switchings from a first level to a second level and second switchings from the second level to the first level, wherein the enable signal starts according to one first switching of the transmission signal, and stops when no first switching occur in a predetermined period after one second switching of the transmission signal, and wherein rising edges of the decoded signal correspond to the first switchings of the transmission signal; a counter, under enablement by the enable signal, counting a number of the rising edges of the decoded signal or the first switchings of the transmission signal, and generating a count; and a single short pulse generator generating a short pulse according to the start of the enable signal to reset the decoded signal.

In another perspective of the present invention, it provides a single wire transmission interface comprising: a signal detection circuit detecting level switchings of a transmission signal from a single wire, and generating an enable signal and a decoded signal corresponding to the transmission signal, the level switchings including first switchings from a first level to a second level and second switchings from the second level to the first level, wherein the enable signal starts according to one first switching of the transmission signal, and stops when no first switching occur in a predetermined period after one second switching of the transmission signal, and wherein falling edges of the decoded signal correspond to the first switchings of the transmission signal; a counter, under enablement by the enable signal, counting a number of the falling edges of the decoded signal or the first switchings of the transmission signal, and generating a count; and a single short pulse generator generating a short pulse according to the start of the enable signal to reset the decoded signal.

In the foregoing single wire transmission interface, when the enable signal stops, the decoded signal can maintain at a high level or a low level. In one embodiment, when the enable signal stops, the decoded signal maintains its current level and does not change its status.

In another perspective of the present invention, it provides a method for single wire transmission, comprising: detecting level switchings of a transmission signal from a single wire, wherein the level switchings include first switchings from a first level to a second level and second switchings from the second level to the first level; generating an enable signal and a decoded signal corresponding to the transmission signal, wherein the enable signal starts according to one first switching of the transmission signal, and stops when no first switching occur in a predetermined period after one second switching of the transmission signal, and wherein rising edges of the decoded signal correspond to the first switchings of the transmission signal; under enablement by the enable signal, counting a number of the rising edges of the decoded signal or the first switchings of the transmission signal, and generating a count; and generating a short pulse according to the start of the enable signal to reset the decoded signal.

In yet another perspective of the present invention, it provides a method for single wire transmission, comprising: detecting level switchings of a transmission signal from a single wire, wherein the level switchings include first switchings from a first level to a second level and second switchings from the second level to the first level; generating an enable signal and a decoded signal corresponding to the transmission signal, wherein the enable signal starts according to one first switching of the transmission signal, and stops when no first switching occur in a predetermined period after one second switching of the transmission signal, and wherein falling edges of the decoded signal correspond to the first switchings of the transmission signal; under enablement by the enable signal, counting a number of the falling edges of the decoded signal or the first switchings of the transmission signal, and generating a count; and generating a short pulse according to the start of the enable signal to reset the decoded signal.

In the foregoing method for single wire transmission, when the enable signal stops, the decoded signal can maintain at a high level or a low level. In one embodiment, when the enable signal stops, the decoded signal maintains its current level and does not change its status.

The objectives, technical details, features, and effects of the present invention will be better understood with regard to the detailed description of the embodiments below, with reference to the drawings.

DESCRIPTION OF THE PREFERRED EMBODIMENTS

Figure 1:
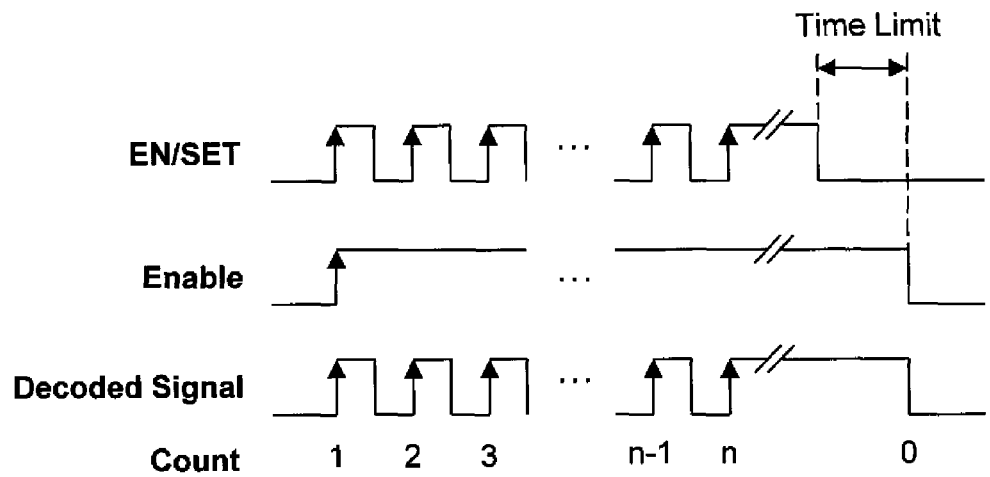
FIG. 1 shows a waveform in a prior art circuit.
Figure 2:
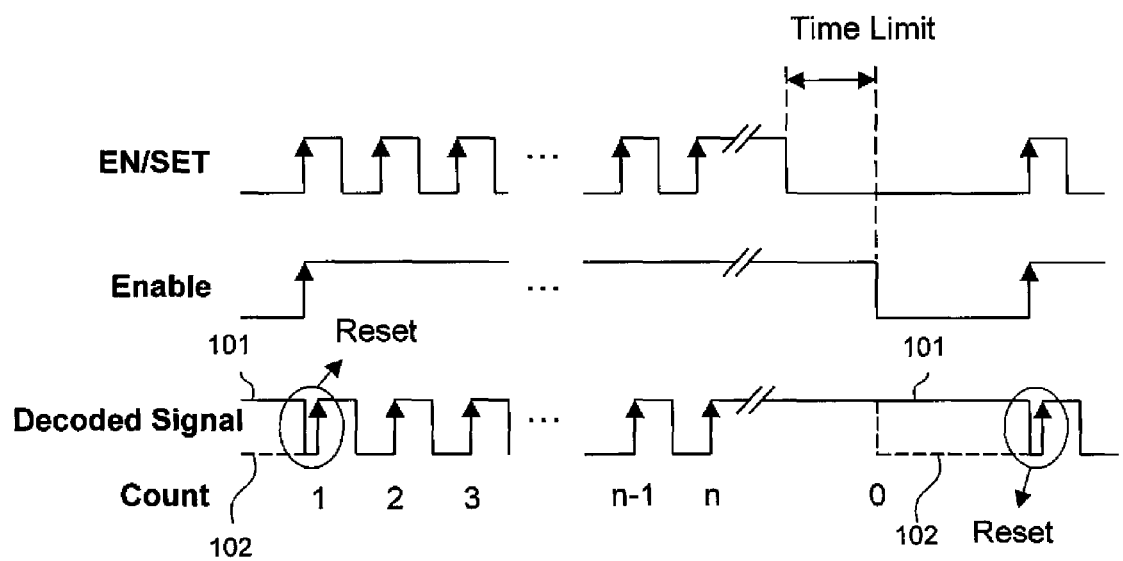
FIG. 2 shows a waveform of the present invention.

Please refer to FIG. 2, which illustrates the operation of the present invention. A single wire transmission interface generates an enable signal Enable according to a rising edge of an EN/SET signal, and generates a decoded signal corresponding to the EN/SET signal. The single wire transmission interface includes a counter (which will be discussed later) counting a number of the rising edges of the EN/SET signal (1~n). When the single wire transmission interface detects a falling edge of the EN/SET signal, it starts counting a time-out period. If a next rising edge is not detected within a time limit, it will stop the enable signal Enable, and reset the count. The present invention is different from the prior art in that: when the enable signal Enable stops, the decoded signal can be at any level and does not require to return to a low level. As shown in the figure, the decoded signal can stay at a high level 101 or a low level 102 according to the requirement of a next-stage circuit.

When the enable signal Enable returns to the high level again, the single wire transmission interface of the present invention generates a reset signal, such that the decoded signal returns to the low level, regardless whether it previously stays at the high level 101 or the low level 102. This can ensure that a subsequently generated decoded signal is correct and unaffected by the previous level of the decoded signal.

Figure 3:
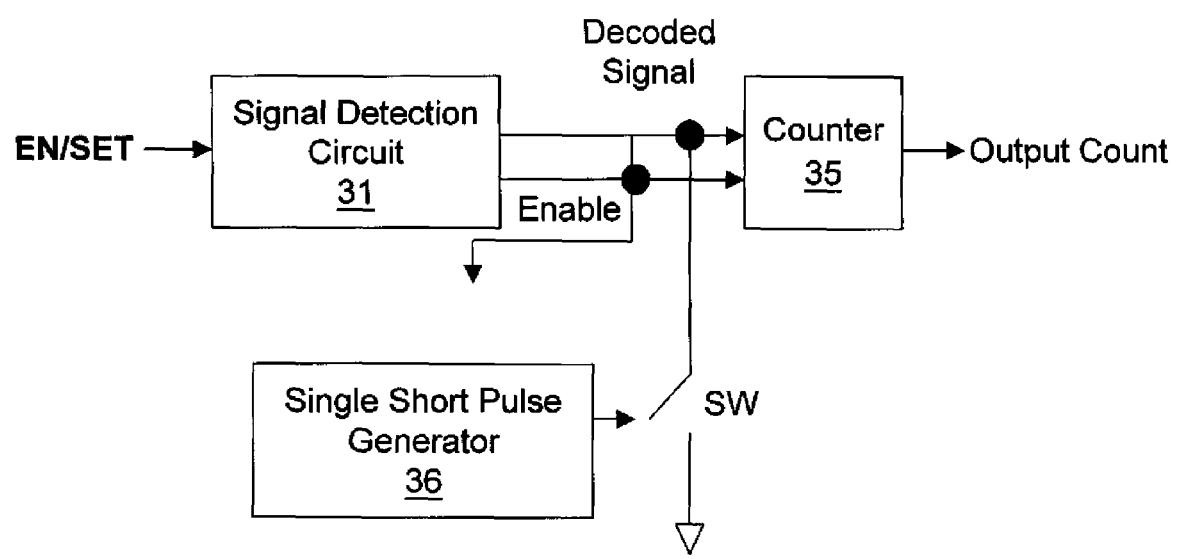
FIG. 3 is a circuit diagram showing a hardware embodiment of the present invention.

The single wire transmission interface of the present invention can be embodied in many hardware forms, to generate the waveforms as shown in FIG. 2. FIG. 3 shows one example, in which the single wire transmission interface of the present invention includes a signal detection circuit 31, a counter 35, a single short pulse generator 36, and a switch SW. The signal detection circuit 31 detects the rising edge and the falling edge of the EN/SET signal. Based on a preset time limit (the time-out period), the signal detection circuit 31 generates the enable signal Enable and the decoded signal corresponding to the EN/SET signal. The counter 35 counts the number of the rising edges of the decoded signal (in this embodiment, it is equal to counting the number of the rising edges of the EN/SET signal), and generates a count. The single short pulse generator 36 generates a short pulse according to the rising edge of the enable signal Enable. This short pulse turns on the switch SW and resets the decoded signal, and thereafter the switch SW returns to open circuit. As such, the waveforms as shown in the FIG. 2 can be generated.

In the foregoing embodiment, the definition of high and low levels can be interchanged; for example, the enable signal Enable can be generated according to the falling edge of the EN/SET signal, or the decoded signal can be a waveform of which high and low levels are interchanged (i.e., its falling edge corresponds to the rising edge of the EN/SET signal in FIG. 2), or both, and so on.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. In view of the foregoing, the spirit of the present invention should cover all such and other modifications and variations, which should be interpreted to fall within the scope of the following claims and their equivalents.

What is claimed is:

1. A single wire transmission interface comprising:
    a signal detection circuit detecting level switchings of a transmission signal from a single wire, and generating an enable signal and a decoded signal corresponding to the transmission signal, the level switchings including first switchings from a first level to a second level and second switchings from the second level to the first level, wherein the enable signal starts according to one first switching of the transmission signal, and stops when no first switching occur in a predetermined period after one second switching of the transmission signal, and wherein rising edges of the decoded signal correspond to the first switchings of the transmission signal;
    a counter, under enablement by the enable signal, counting a number of the rising edges of the decoded signal or the first switchings of the transmission signal, and generating a count; and
    a single short pulse generator generating a short pulse according to the start of the enable signal to reset the decoded signal.

2. The single wire transmission interface of claim 1, further comprising a reset switch controlled by an output of the single short pulse generator, the decoded signal being reset when the reset switch is turned on.

3. The single wire transmission interface of claim 1, wherein the decoded signal maintains its current level and does not change its status when the enable signal stops.

4. The single wire transmission interface of claim 1, wherein the decoded signal maintains at a high level when the enable signal stops.

5. A single wire transmission interface comprising:
    a signal detection circuit detecting level switchings of a transmission signal from a single wire, and generating an enable signal and a decoded signal corresponding to the transmission signal, the level switchings including first switchings from a first level to a second level and second switchings from the second level to the first level, wherein the enable signal starts according to one first switching of the transmission signal, and stops when no first switching occur in a predetermined period after one second switching of the transmission signal, and wherein falling edges of the decoded signal correspond to the first switchings of the transmission signal;
    a counter, under enablement by the enable signal, counting a number of the falling edges of the decoded signal or the first switchings of the transmission signal, and generating a count; and
    a single short pulse generator generating a short pulse according to the start of the enable signal to reset the decoded signal.

6. The single wire transmission interface of claim 5, further comprising a reset switch controlled by an output of the single short pulse generator, the decoded signal being reset when the reset switch is turned on.

7. The single wire transmission interface of claim 5, wherein the decoded signal maintains its current level and does not change its status when the enable signal stops.

8. The single wire transmission interface of claim 5, wherein the decoded signal maintains at a high level when the enable signal stops.

9. A method for single wire transmission, comprising:
    detecting level switchings of a transmission signal from a single wire, wherein the level switchings include first switchings from a first level to a second level and second switchings from the second level to the first level;

generating an enable signal and a decoded signal corresponding to the transmission signal, wherein the enable signal starts according to one first switching of the transmission signal, and stops when no first switching occur in a predetermined period after one second switching of the transmission signal, and wherein rising edges of the decoded signal correspond to the first switchings of the transmission signal;

under enablement by the enable signal, counting a number of the rising edges of the decoded signal or the first switchings of the transmission signal, and generating a count; and generating a short pulse according to the start of the enable signal to reset the decoded signal.

10. The method of claim 9, wherein the decoded signal maintains its current status when the enable signal stops.

11. The method of claim 9, wherein the decoded signal maintains at a high level when the enable signal stops.

12. A method for single wire transmission, comprising:

detecting level switchings of a transmission signal from a single wire, wherein the level switchings include first switchings from a first level to a second level and second switchings from the second level to the first level;

generating an enable signal and a decoded signal corresponding to the transmission signal, wherein the enable signal starts according to one first switching of the transmission signal, and stops when no first switching occur in a predetermined period after one second switching of the transmission signal, and wherein falling edges of the decoded signal correspond to the first switchings of the transmission signal;

under enablement by the enable signal, counting a number of the falling edges of the decoded signal or the first switchings of the transmission signal, and generating a count; and generating a short pulse according to the start of the enable signal to reset the decoded signal.

13. The method of claim 12, wherein the decoded signal maintains its current status when the enable signal stops.

14. The method of claim 12, wherein the decoded signal maintains at a high level when the enable signal stops.

* * * * *